United States Patent Office 2,776,202
Patented Jan. 1, 1957

2,776,202

USE OF LEPIDOLITE AS AN ADDITIVE IN THE LIME-ROASTING OF LITHIUM-ALUMINOSILICATE ORES

Harold Mazza, Stanley L. Cohen, and Glen H. Schafer, Trona, Calif., assignors to American Potash & Chemical Corporation, a corporation of Delaware No Drawing. Application August 18, 1955, Serial No. 529,348

4 Claims. (Cl. 75—1)

This invention relates to recovery of lithium from the lithium-containing ores, spodumene and petalite. It is known that these lithium ores can be roasted with calcium carbonate to render the lithium content water soluble, the soluble lithium salts being, thereafter, extracted. In effecting the roasting of these ores, it is necessary to use relatively high temperatures, e. g., temperatures of the order of 1100° and 1200° C.

We have found that these lithium ores can be successfully roasted with calcium carbonate, at a significantly lower temperature and to economic advantage if lepidolite is present as a constituent in the roast. Apparently, the fluxing constitutents in the lepidolite are such that they enable the lithium values to be extracted from such ores when these are first roasted with calcium carbonate at temperatures of the order of 800° to 950° C. It has heretofore been necessary to heat spodumene and petalite to temperatures of the order of 1000°–1200° C. to change their mineral form to one upon which subsequently lime-roasting could be successfully practiced. Thus, the presence of lepidolite in the roast obviates the heating to a high temperature of spodumene or petalite and enables the lime-roast to be carried out at a much lower temperature.

Typical analyses of lepidolite and of the lithium aluminosilicate ores are given in Table I.

TABLE I

| Ore | $Li_2O$, Percent | $Na_2O$, Percent | $K_2O$, Percent | $Rb_2O$, Percent | $Cs_2O$, Percent | $SiO_2$, Percent | $Al_2O_3$, Percent | F, Percent |
|---|---|---|---|---|---|---|---|---|
| Lepidolite | 4.19 | 0.56 | 8.55 | 3.39 | 0.25 | 52.3 | 28.8 | 5.88 |
| Spodumene | 6.00 | 0.55 | 0.48 | none | none | 63.6 | 28.7 | none |
| Petalite | 4.73 | 0.17 | 0.02 | none | none | 77.7 | 17.1 | none |

The practice of the present invention will become further apparent upon consideration of the following.

*Example 1.*—A series of roasts were made using (1) mixtures of 60% petalite and 40% lepidolite and (2) mixtures of 60% spodumene and 40% lepidolite. The limestone-to-ore ratio on a weight basis was 3.63 to 1 for the petalite-lepidolite mixtures, and 3.2 to 1 for the spodumene-lepidolite mixtures; these ratios were such as to maintain a constant calcium-to-silica ratio in the charge. The individual charges consisted, respectively, of 12.98 grams of lepidolite and 19.44 grams of petalite with 117.6 grams limestone, and 14.28 grams of lepidolite, and 21.42 grams of spodumene mixed with 114.3 grams limestone. These charges were roasted in stainless steel crucibles in a laboratory muffle furnace at 900° C. for from 105 to 150 minutes, as shown in the following tables. The resulting clinkers were each quenched in one liter of hot water and then leached with agitation and at boiling under reflux for sixteen hours. The results obtained are tabulated below:

TABLE II

| | Test No. | | | |
|---|---|---|---|---|
| | I | II | III | IV |
| Lepidolite, grams | 12.96 | 12.96 | 14.28 | 14.28 |
| Petalite, grams | 19.44 | 19.44 | | |
| Spodumene, grams | | | 21.42 | 21.42 |
| Limestone, grams | 117.6 | 117.6 | 114.3 | 114.3 |
| Limestone-ore ratio | 3.63:1 | 3.63:1 | 3.2:1 | 3.2:1 |
| Roast temperature, °C | 900 | 900 | 900 | 900 |
| Roast time, hours | 1.75 | 2 | 2 | 2.25 |
| $CO_2$ content of clinker, percent | 6.8 | 6.5 | 5.6 | 5.0 |
| Lithium recovery, percent | 78.7 | 82.5 | 84.4 | 85.0 |
| Alumina in leach liquor, percent | 0.004 | 0.004 | 0.004 | 0.004 |

Similar mixtures of petalite and lepidolite and of spodumene and lepidolite were also roasted at 1200° C. and 1100° C., respectively. These are the temperatures normally used in lime-roasting usual petalite and spodumene ores. The clinkers were quenched and leached as before. The results are tabulated below:

TABLE III

| | Test No. | | | |
|---|---|---|---|---|
| | I | II | III | IV |
| Lepidolite, grams | 12.96 | 12.96 | 14.28 | 14.28 |
| Petalite, grams | 19.44 | 19.44 | | |
| Spodumene, grams | | | 21.42 | 21.42 |
| Limestone, grams | 117.6 | 117.6 | 114.3 | 114.3 |
| Limestone-ore ratio | 3.63:1 | 3.63:1 | 3.2:1 | 3.2:1 |
| Roast temperature, °C | 1,200 | 1,200 | 1,100 | 1,100 |
| Roast time, hours | 2 | 2 | 2 | 2 |
| $CO_2$ content of clinker, percent | 0.80 | 0.75 | 0.58 | 0.53 |
| Lithium recovery, percent | 46.8 | 50.9 | 63.7 | 50.9 |
| Lithium lost through vaporization, percent | 35.7 | 32.3 | 7.7 | 15.2 |
| Alumina in leach liquor, percent | 0.004 | 0.004 | 0.004 | 0.004 |

The lithium recovery is based on the quantity of lithium hydroxide recovered in the leach liquor. The recovery was low because lithium values were volatilized during roasting and hence were lost to the leach system. The data shown in Tables II and III show that the use of lepidolite as an additive to either petalite or spodumene permits the ores to be roasted at temperatures substantially lower than would be necessary if these ores were lime-roasted alone; i. e., 900° C. rather than 1100° to 1200° C.

*Example 2.*—A series of roasts was made using mixtures of 90% petalite and 10% lepidolite and mixtures of 90% spodumene and 10% lepidolite. As in Example 1, the limestone-to-ore ratio was 3.63 to 1 for the petalite-lepidolite mixtures, and 3.2 to 1 for the spodumene-lepidolite mixtures. The individual charges consisted respectively of 3.24 grams of lepidolite and 29.16 grams of petalite mixed with 117.6 grams of limestone, and 3.57 grams of lepidolite and 32.14 grams of spodumene mixed with 114.3 grams limestone. The methods of roasting and leaching the charges were identical to those given in Example 1. The results obtained are tabulated below:

TABLE IV

| | Test No. | | | |
|---|---|---|---|---|
| | I | II | III | IV |
| Lepidolite, grams | 3.24 | 3.24 | 3.57 | 3.57 |
| Petalite, grams | 29.16 | 29.16 | | |
| Spodumene, grams | | | 32.14 | 32.14 |
| Limestone, grams | 117.6 | 117.6 | 114.3 | 114.3 |
| Limestone-ore ratio | 3.63:1 | 3.63:1 | 3.2:1 | 3.2:1 |
| Roast temperature, °C | 900 | 900 | 900 | 900 |
| Roast time, hours | 1.75 | 2 | 2 | 2.25 |
| $CO_2$ content of clinker, percent | 7.5 | 8.0 | 5.5 | 5.7 |
| Lithium recovery, percent | 65.7 | 67.3 | 49.8 | 52.4 |
| Alumina in leach liquor, percent | <0.004 | <0.004 | <0.004 | <0.004 |

For comparative purposes, the results obtained when lime-roasting petalite and spodumene at the temperatures and for the roast times used in Examples 1 and 2 are shown below:

TABLE V

| | Test No. | | | |
|---|---|---|---|---|
| | I | II | III | IV |
| Petalite, grams | 50 | 50 | | |
| Spodumene, grams | | | 50 | 50 |
| Calcium carbonate, grams | 150 | 150 | 150 | 150 |
| Calcium carbonate-ore ratio | 3.01:1 | 3.0:1 | 3.0:1 | 3.0:1 |
| Roast temperature, °C | 900 | 1200 | 900 | 1100 |
| Roast time, hours | 2 | 2 | 2 | 2 |
| Lithium recovery, percent | 16.9 | 81.0 | 13.5 | 82.3 |

A comparison of Tables IV and V shows that a marked improvement in lithium recovery can be obtained when lime-roasting petalite or spodumene at 900° C. by adding a small quantity of lepidolite to the roast mixture. As can be seen from the data, the quantity of lepidolite can be as low as approximately 10% of the weight of the total lithium ore treated. The lepidolite content of the charge can be increased until lepidolite provides substantially the only lithium source, but, as we have indicated, the temperature of the roast can be reduced to 900° C. when as little as 10% is present. The utilization of a larger quantity of lepidolite, e. g., about 40%, makes it possible to provide a very economical process for the recovery of lithium values at relatively low roast temperatures.

Spodumene and petalite mixtures can also be roasted successfully by adding lepidolite to such a mixture. The limestone to mixed ore ratio must be based on the effective or available quantity of calcium carbonate present. Thus, one should correct the actual quantity of limestone by taking into account the quantities present of magnesium oxide, silica, and alumina. Magnesium carbonate is effective as a substitute for calcium carbonate to a limited extent. Those skilled in the ore roasting art will have no difficulty in selecting a good limestone and in arriving at the proper quantity of the natural limestone selected.

We claim:

1. In a lime-roast process for recovering lithium, the step comprising roasting a finely divided mixture of calcium carbonate, lepidolite and an ore selected from the group consisting of spodumene, petalite, and mixtures thereof, at a temperature of from about 800° C. to about 950° C., the lepidolite providing at least approximately 10% of the total weight of the lithium ore mixture.

2. In a lime-roast process for recovering lithium, the step comprising roasting a finely divided mixture of calcium carbonate, lepidolite and an ore selected from the group consisting of spodumene, petalite, and mixtures thereof, at a temperature of from about 800° C. to about 950° C., the lepidolite providing at least approximately 40% of the total weight of the lithium ore mixture.

3. In a lime-roast process for recovering lithium, the step comprising roasting a finely divided mixture of calcium carbonate, lepidolite and an ore selected from the lithium-aluminosilicate group such as spodumene and petalite, and mixtures thereof, at a temperature of from about 800° C. to about 950° C., the lepidolite providing at least approximately 10% of the total weight of the lithium ore mixture, the available calcium carbonate to lepidolite and ore ratio being between three and four to one.

4. In a lime-roast process for recovering lithium, the step comprising roasting a finely divided mixture of calcium carbonate, lepidolite and an ore selected from the lithium-aluminosilicate group such as spodumene and petalite, and mixtures thereof, at a temperature of from about 800° C. to about 950° C., the lepidolite providing at least approximately 40% of the total weight of the lithium ore mixture, the available calcium carbonate to lepidolite and ore ratio being between three and four to one.

References Cited in the file of this patent

UNITED STATES PATENTS

| 2,020,854 | Rosett | Nov. 12, 1935 |
| 2,662,809 | Kroll | Dec. 15, 1953 |